US010797743B1

(12) United States Patent
Sessions

(10) Patent No.: US 10,797,743 B1
(45) Date of Patent: Oct. 6, 2020

(54) PROTECTIVE AND SUPPORTIVE ENCLOSURES FOR ELECTRONIC DEVICES

(71) Applicant: Amy Sessions, Granite Bay, CA (US)

(72) Inventor: Amy Sessions, Granite Bay, CA (US)

(*) Notice: Subject to any disclaimer, the term of this patent is extended or adjusted under 35 U.S.C. 154(b) by 0 days.

(21) Appl. No.: 16/897,869

(22) Filed: Jun. 10, 2020

Related U.S. Application Data

(63) Continuation-in-part of application No. 29/726,649, filed on Mar. 4, 2020.

(60) Provisional application No. 62/860,671, filed on Jun. 12, 2019.

(51) Int. Cl.
| | | |
|---|---|---|
| *H04B 1/3888* | (2015.01) | |
| *H04M 1/04* | (2006.01) | |
| *A45C 13/10* | (2006.01) | |
| *A45C 11/00* | (2006.01) | |
| *F16M 13/00* | (2006.01) | |

(52) U.S. Cl.
CPC ............ *H04B 1/3888* (2013.01); *H04M 1/04* (2013.01); *A45C 13/103* (2013.01); *A45C 2011/002* (2013.01); *F16M 13/005* (2013.01)

(58) Field of Classification Search
CPC ...... H04B 1/3888; Y10S 224/93; H04M 1/04; H04M 1/05; A45C 2011/002; F16M 13/005
USPC ............. 224/584, 605, 930, 677; 361/679.59
See application file for complete search history.

(56) References Cited

U.S. PATENT DOCUMENTS

| | | | | |
|---|---|---|---|---|
| 1,597,734 | A | * 8/1926 | Sousa, Jr. ............... | A41F 9/002 224/232 |
| 4,747,527 | A | * 5/1988 | Trumpower, II ....... | A41F 9/002 2/311 |
| 5,285,833 | A | * 2/1994 | Haxby ..................... | A45C 1/04 150/102 |
| 5,524,802 | A | 6/1996 | Benson et al. | |
| D460,260 | S | * 7/2002 | Hassett ........................ | D3/218 |
| 6,568,574 | B2 | * 5/2003 | Jones ...................... | A45C 1/04 224/219 |
| 6,729,518 | B2 | * 5/2004 | Badillo .................... | A45C 9/00 224/240 |

(Continued)

OTHER PUBLICATIONS

Water Resistance Pouch, https://www.aliexpress.com/item/32830158641.html.

(Continued)

*Primary Examiner* — Adam J Waggenspack

(57) ABSTRACT

A protective and supportive enclosure includes a first panel, second panel, zipper, plurality of fasteners, and plurality of bands. The first and second panels are affixed together and form a sleeve that includes an opening. The second panel includes a polymer that is clear and electrically conductive. The first and second panels each include a polygonal overall shape. The zipper is affixed to the opening. Each band is affixed to the primary panel proximate to the opening. Each fastener is pivotably coupled to a band. The protective and supportive enclosure include standing and affixed states. In the standing state, each fastener is further demountably coupled to the band and therewith forms a triangular support. and the protective and supportive enclosure is oriented substantially vertical when resting on the triangular support. In the affixed state, the protective and supportive enclosure is demountably coupled to an object via each fastener.

15 Claims, 11 Drawing Sheets

(56) References Cited

U.S. PATENT DOCUMENTS

| | | | | |
|---|---|---|---|---|
| 8,668,122 | B2* | 3/2014 | Case | A45F 3/02 |
| | | | | 224/218 |
| 9,351,551 | B2* | 5/2016 | Morgan | A45C 11/00 |
| 9,883,732 | B2* | 2/2018 | Palma | A45F 5/004 |
| 9,980,541 | B2* | 5/2018 | Piro | H04B 1/3888 |
| 2005/0017040 | A1* | 1/2005 | Roberts | A45C 13/18 |
| | | | | 224/617 |
| 2007/0235492 | A1* | 10/2007 | Sirichai | H04B 1/3888 |
| | | | | 224/675 |
| 2012/0152989 | A1 | 6/2012 | Draper | |
| 2020/0000198 | A1* | 1/2020 | Schroeder | B65D 33/06 |

OTHER PUBLICATIONS

Car Back Seat Tablet Organizer, https://www.ebay.com/itm/Zone-Tech-Car-Back-Seat-Tablet-Organizer-Ipad-Case-Sleeve-Pouch-Drive-Holder-/291774284094?_trksid=p2349526.m4383.l10137.c10&nordt=true&rt=nc&orig_cvip=true.
Waterproof Underwater Case, https://www.ebay.co.uk/itm/Universal-Waterproof-Underwater-Phone-Case-Dry-Bag-Pouch-For-All-Smartphones-W/174292597328?hash=item2894a5fa50:g:zAYAAOSwl2Bd3jK2.

\* cited by examiner

PROTECTIVE AND SUPPORTIVE ENCLOSURES FOR ELECTRONIC DEVICES

CROSS-REFERENCE TO RELATED APPLICATIONS

This application claims priority to U.S. Provisional Application No. 62/860,671 filed Jun. 12, 2019, which is hereby incorporated herein by reference.

FIELD OF INVENTION

The present disclosure relates generally to enclosures. More specifically, the present disclosure describes protective and supportive enclosures for electronic devices.

BACKGROUND

Personal electronic devices are typically used for education, entertainment, and work that requires ready access to said devices in every conceivable environment. For example, parents may use these devices to entertain, pacify, and/or educate their children during routine activities (e.g. at breakfast before school, while riding in a stroller, studying at a desk, during road trips, etc.). These routine activities are understood to be performed in a variety of environments that can necessitate devices to be fixed in a variety of positions for effective viewing or use. It is also generally known that infants often find it difficult to maintain a grip on their devices, or to prevent said devices from being damaged, for example, by exposure to fluids or other debris.

Solutions known in the art may address some of the configurations necessary to fulfill these needs, but rarely completely protect electronic devices from exposure and/or damage from fluids. Additionally, such solutions may offer moisture protection but are typically manufactured to accommodate particular electronic devices (i.e. particular brands, manufacturers, models, etc.).

BRIEF DESCRIPTION OF THE DRAWINGS

Some of the embodiments will be described in detail, with reference to the following figures, wherein like designations denote like members, wherein.

Figure 1:
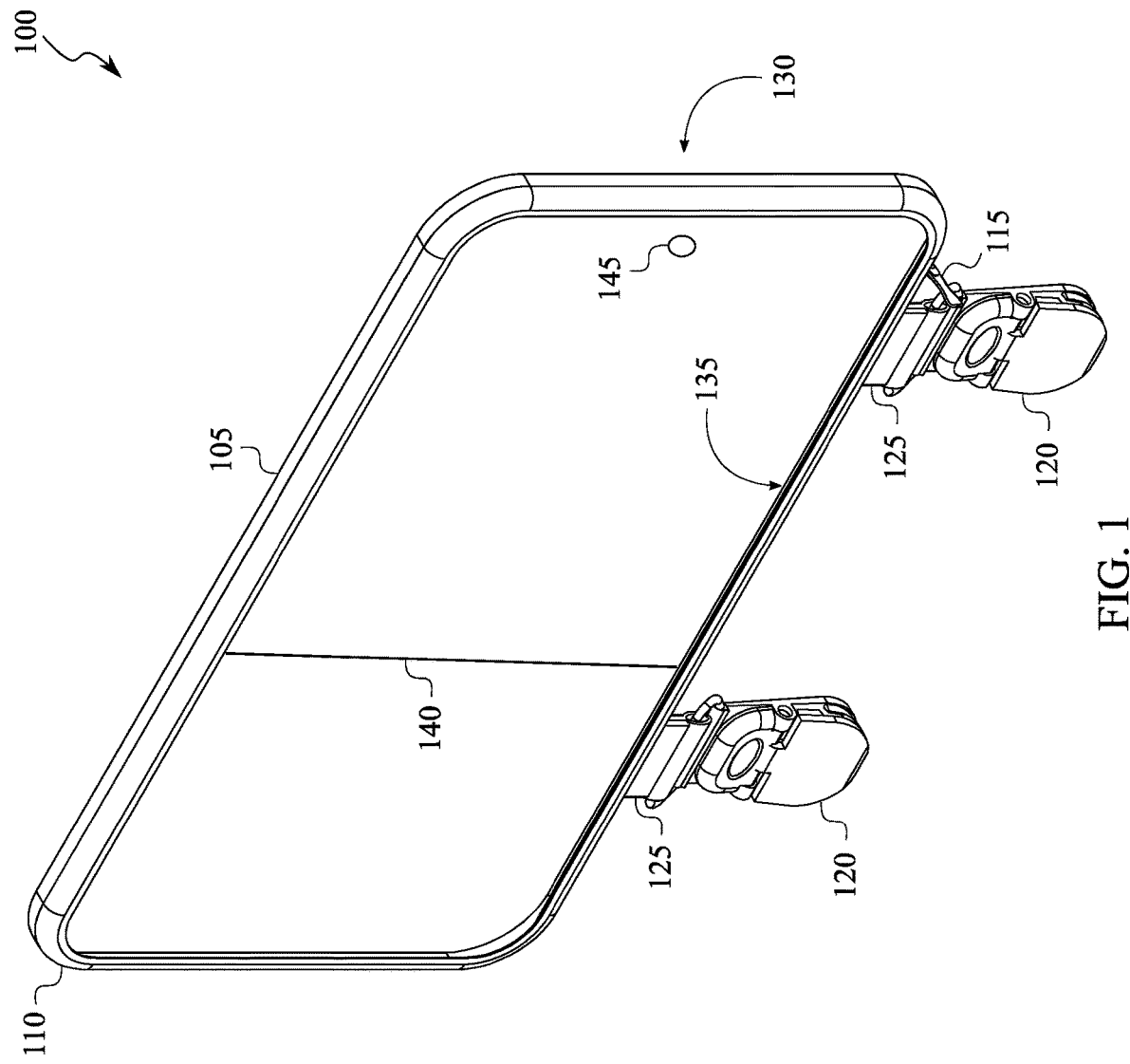
FIG. 1 depicts a perspective view of a protective and supportive enclosure ("enclosure"), in accordance to some embodiments.

Unless otherwise specifically noted, items depicted in the drawings are not necessarily drawn to scale.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

Personal electronic devices are typically used for education, entertainment, and work that requires ready access to said devices in every conceivable environment. For example, parents may use these devices to entertain, pacify, and/or educate their children during routine activities (e.g. at breakfast before school, while riding in a stroller, studying at a desk, during road trips, etc.). These routine activities are understood to be performed in a variety of environments that can necessitate devices to be fixed in a variety of positions for effective viewing or use. It is also generally known that infants often find it difficult to maintain a grip on their devices, or to prevent said devices from being damaged, for example, by exposure to fluids or other debris.

Solutions known in the art may address some of the configurations necessary to fulfill these needs, but rarely completely protect electronic devices from exposure and/or damage from fluids. Additionally, such solutions may offer moisture protection but are typically manufactured to accommodate particular electronic devices (i.e. particular brands, manufacturers, models, etc.). It would therefore be advantageous to users generally, and parents particularly, to have an ability to simultaneously protect a device and secure said device into operable configurations to address different environmental scenarios.

Embodiments of the present invention seek to disclose protective and supportive enclosures for electronic devices. FIG. 1 depicts a perspective view of a protective and supportive enclosure ("enclosure"), generally 100, according to some embodiments. The enclosure 100 preferably includes a first panel 105, a second panel 110, a zipper 115, a plurality of fasteners 120, and a plurality of bands. The first panel 105 and the second panel 110 each comprise a polygonal overall shape. Hence, although the first panel 105 and the second panel 110 are depicts in the FIGS. as substantially rectangular structures, alternative polygonal shapes can be utilized (e.g. to accommodate different electronic device shapes).

The first panel 105 can be formed using polymer sheeting (e.g., acrylic, polyethylene) and/or fabrics (e.g., natural and/or synthetic fabrics). The second panel 110 is preferably clear and electrically conductive. In other words, the second panel 110 is made of an electrically conductive polymer, which can include, but are not limited to PEDOT, PEDOT: PSS and Poly(4,4-dioctylcyclopentadithiophene). Although other materials can be utilized, material included in the first panel 105 and the second panel preferably provides structural integrity. The first panel 105 and the second panel 110 are affixed together and form a sleeve 130 that comprises an opening 135.

In certain embodiments, the sleeve 130 includes a partition 140 positioned therein. For example, the partition 140 can be formed by binding portions of the first panel 105 and the second panel 110 together. The partition 140 can further be formed by adhering a polymeric material or fabric to the first panel 105 of the second panel 110. In certain embodiments, the partition 140 is a separate unit that is removable from the sleeve 130. As a separate unit, the partition 140 can be any shape and/or size that facilitates one or more embodiments disclosed in the instant application. The sleeve 130 can include more than one partition 140 that are interchangeable. For example, the partition 140 can be a separate unit that protects electronic devices from demagnetizing credit cards included in the partition 140. In other embodiments, the sleeve 130 can include openings (e.g., aperture 145) through which users can thread cables for charging, A/V and similar purposes. The aperture 145 can be any diameter that supports one or more of the embodiments discloses in the instant application.

Figure 3:
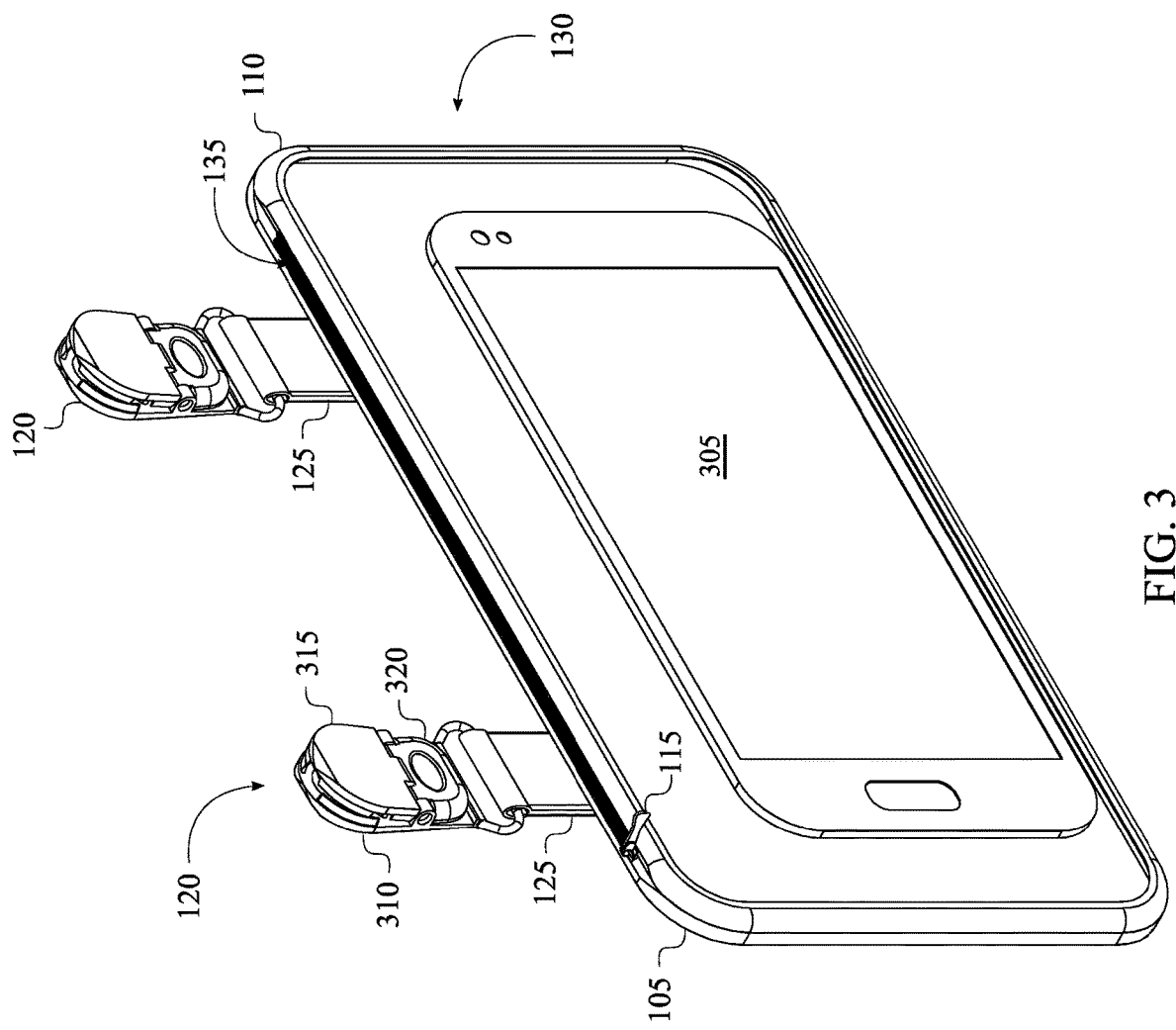
FIG. 3 depicts a perspective view of the enclosure in the affixed state, in accordance with certain embodiments.
Figure 4:
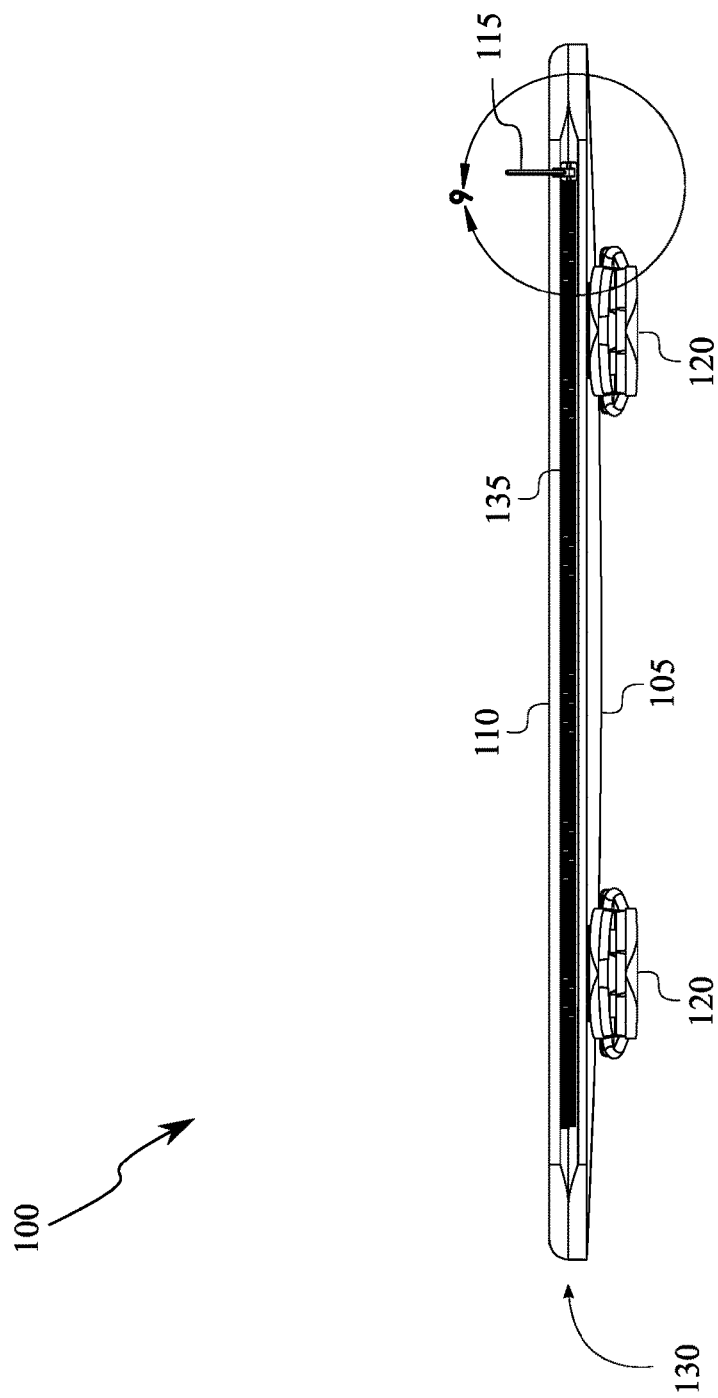
FIG. 4 depicts a side view of the enclosure, in accordance with yet still other embodiments.
Figure 9:
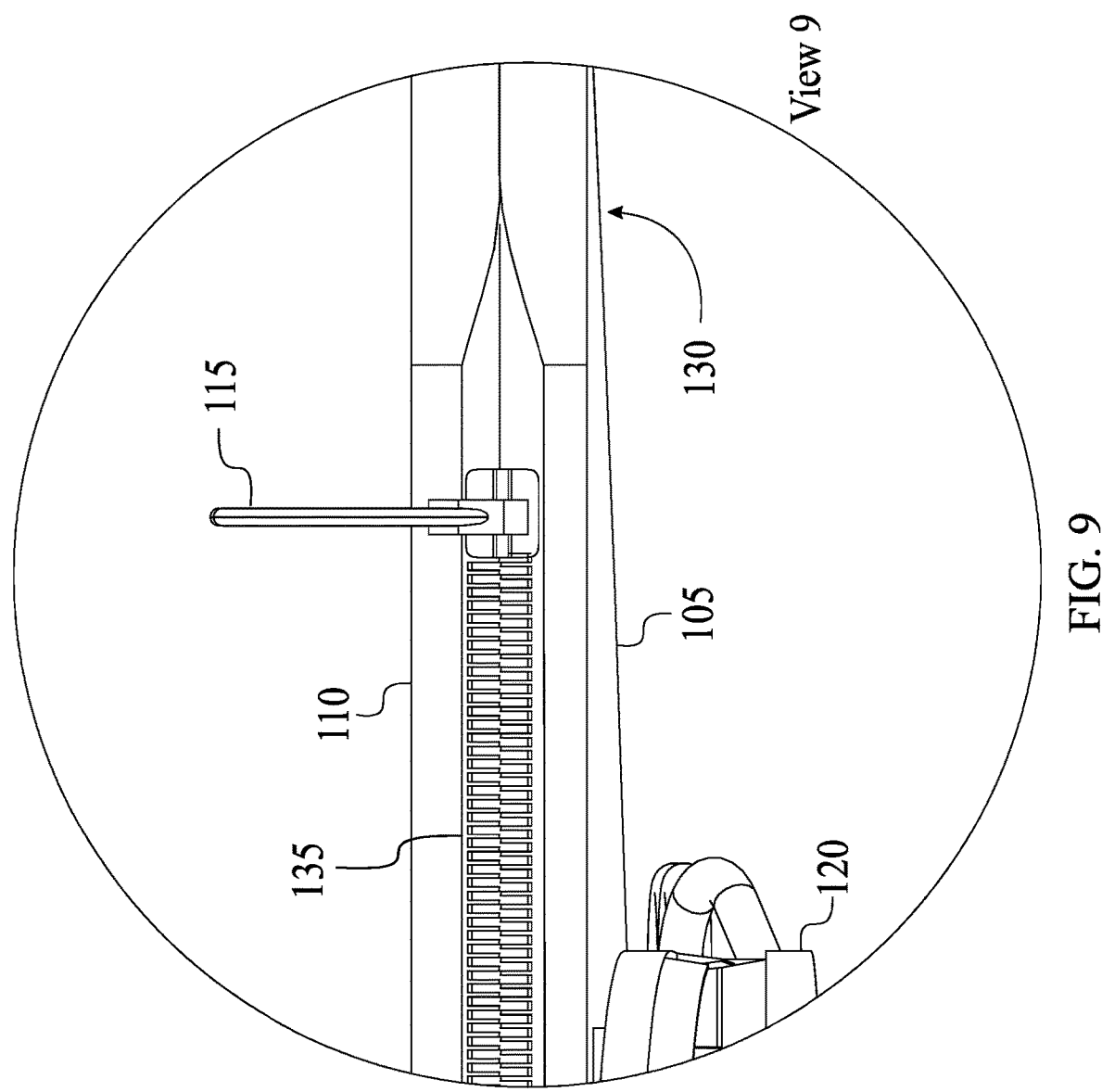
FIG. 9 depicts a close-up of a zipper affixed to an opening of a sleeve, specifically View 9 of FIG. 4, in accordance with some embodiments.
Figure 10:
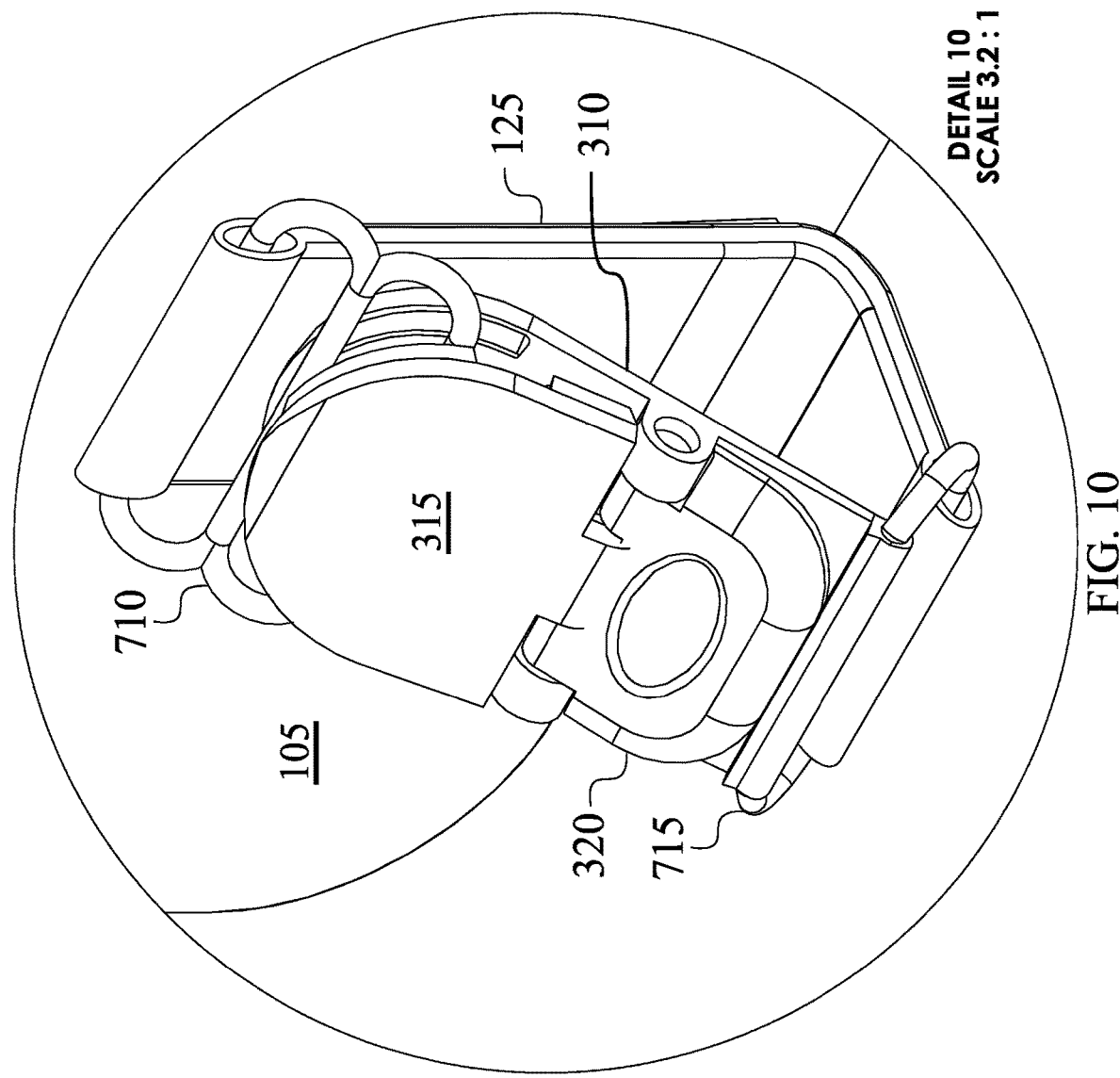
FIG. 10 depicts a close-up of the triangular support, specifically View 10 of FIG. 5, in accordance with certain embodiments.

As reflected in FIGS. 3, 4 and 9, the zipper 115 is affixed to the opening 135 and functions in a manner similar to typical zippers known in the art. The enclosure 100 preferably protects electronic devices and other objects from spills and other moisture events. For example, the zipper 115 hermetically seals the opening 135, according to some embodiments. The plurality of bands 125 are preferably flexible, rectangular, and planar in shape. To be sure, alternative shapes can be used for the plurality of bands 125 if they provide sufficient structural integrity required for the disclosed embodiments of the instant application. Each band 125 is affixed to the primary panel 105 proximate to the opening 135. Each fastener 120 is pivotably coupled to a band 125.

Figure 5:
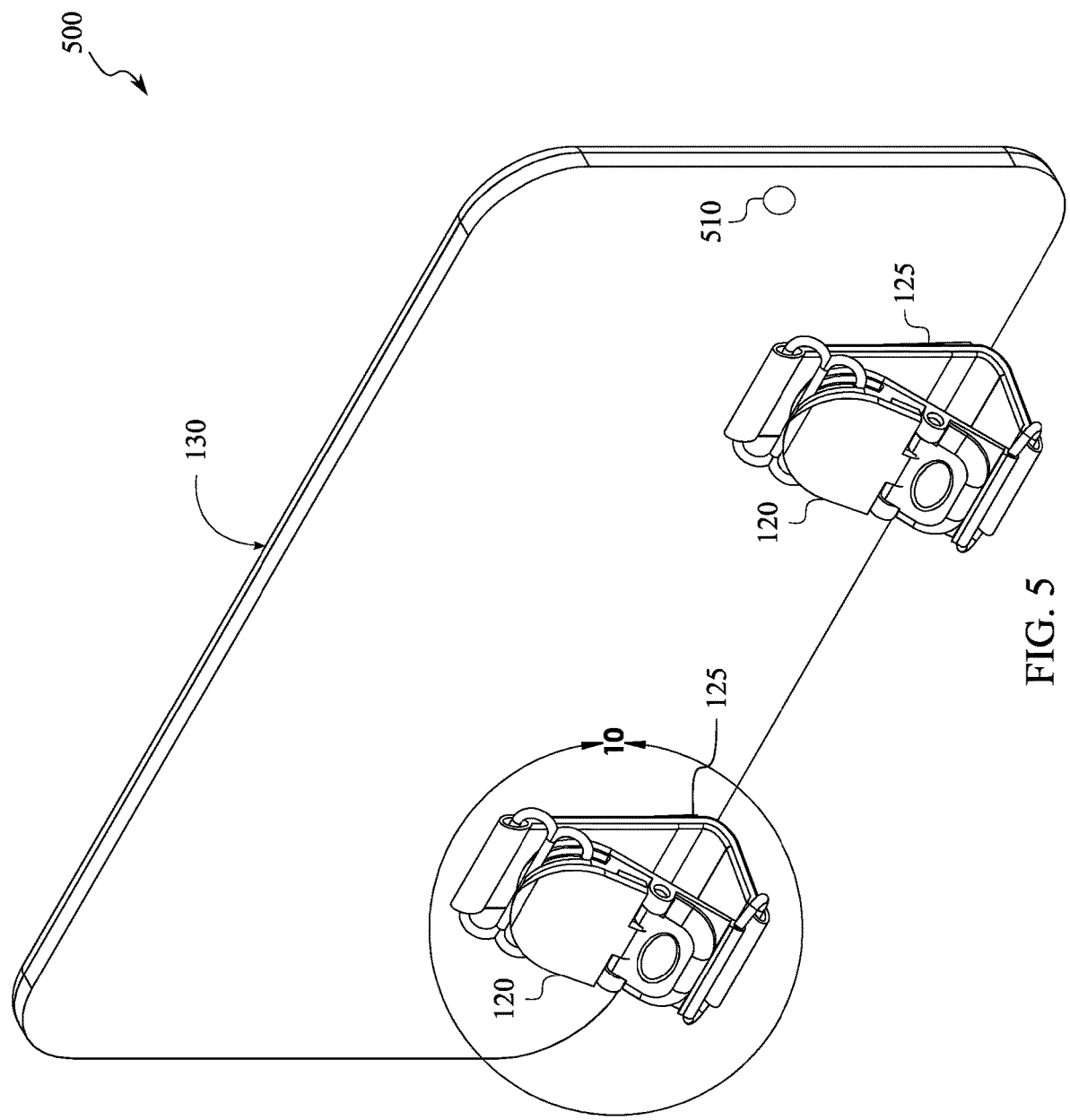
FIG. 5 depicts a rear perspective view of the enclosure in a standing state, in accordance with some embodiment of the present invention.
Figure 6:
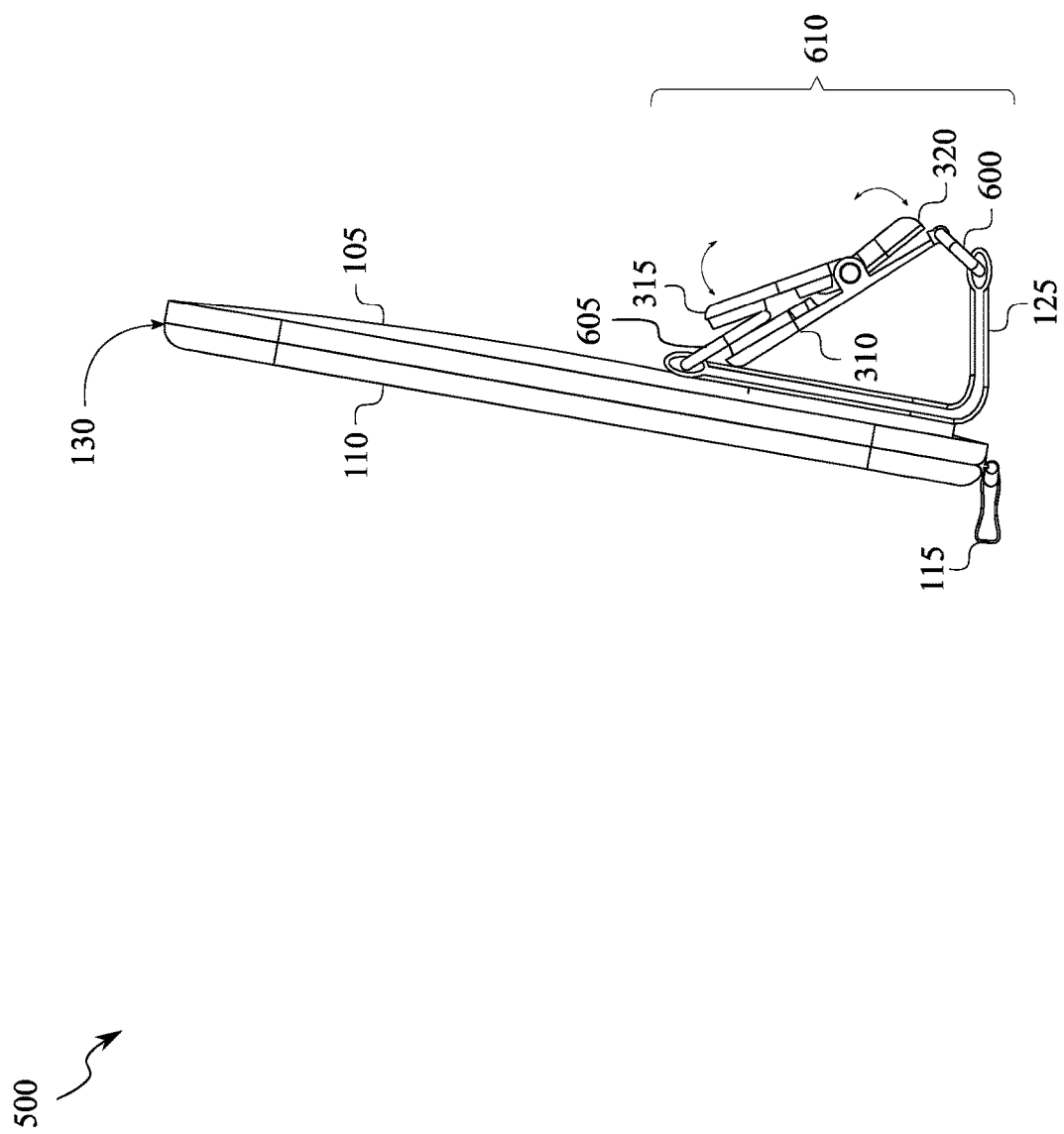
FIG. 6 depicts a side view of the enclosure in the standing state, in accordance with other embodiments.
Figure 7:
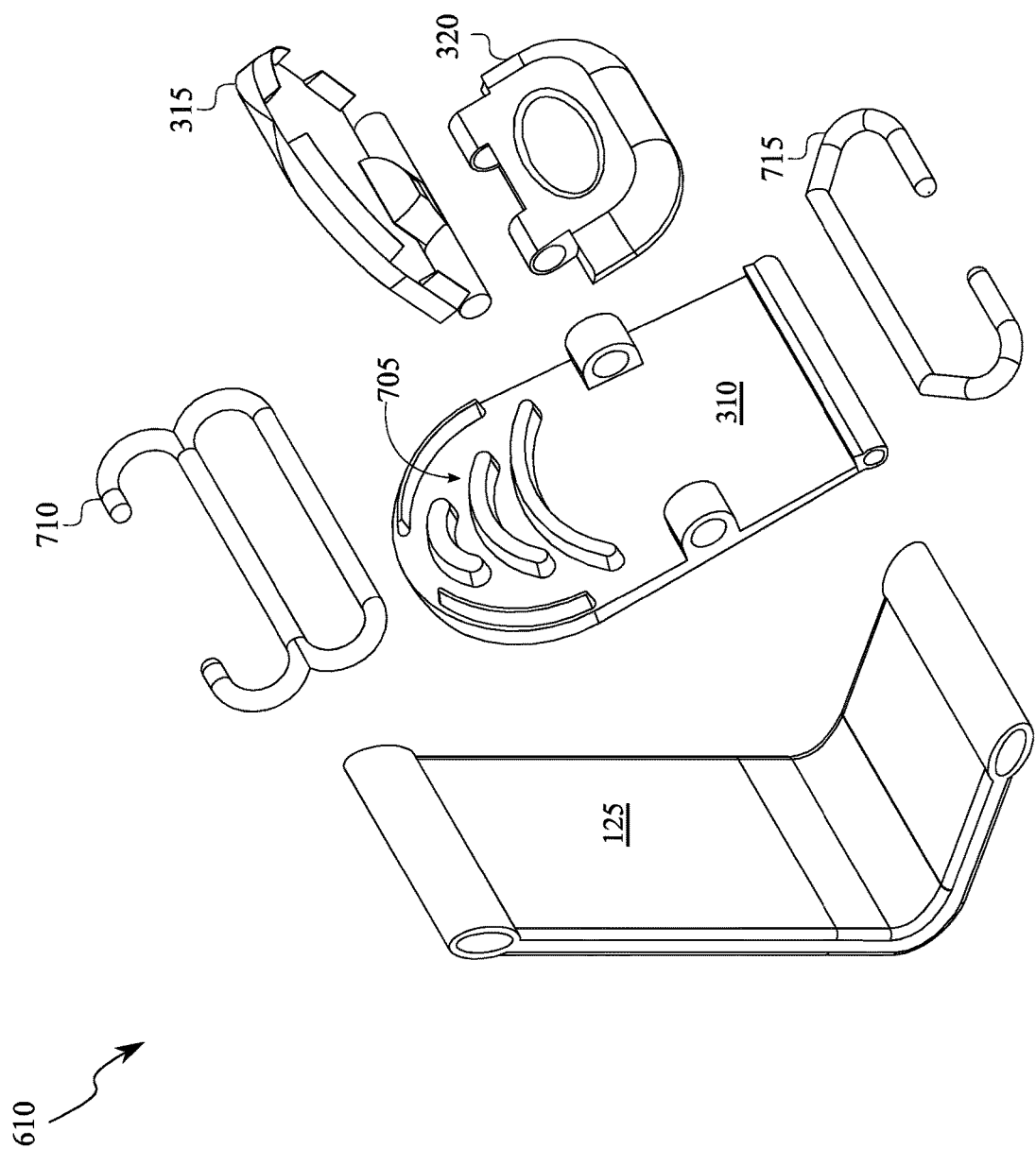
FIG. 7 depicts an exploded view of a triangular support, in accordance with certain embodiments.

As depicted in FIGS. 5-7, each fastener 120 preferably includes a main body 310, an engaging arm 315, and a locking arm 320. The engaging arm is pivotably coupled to the main body 310 and the locking arm is pivotably coupled to the main body 310 proximate to the engaging arm 315. The main body 310 comprises a plurality of protrusions 705 that extend normal to the main body 310. The engaging arm 315 is configured to engage the main body 310. The locking arm 320 selectively locks the engaging arm 315 in position when the engaging arm 315 engages the main body 310.

Figure 8:
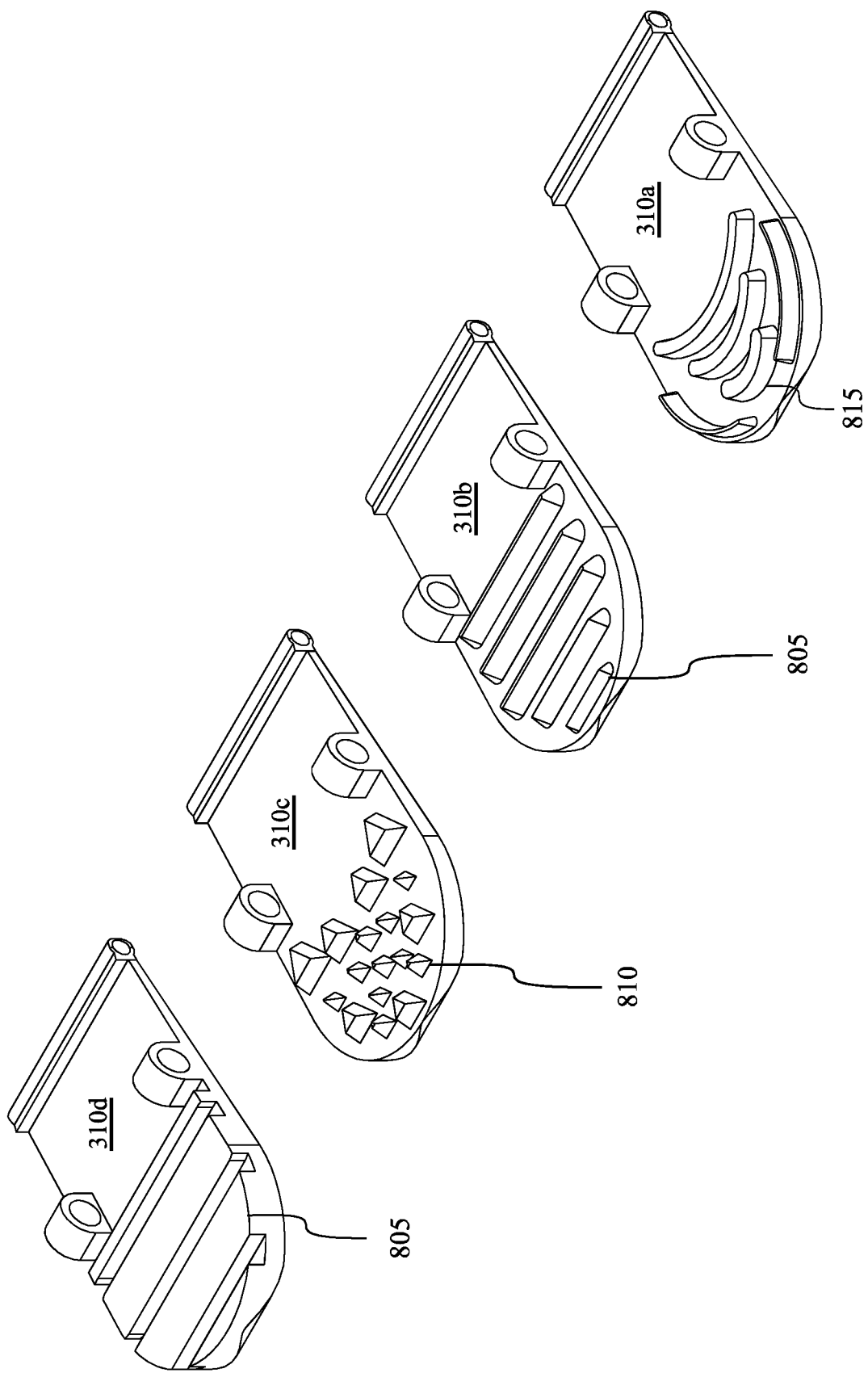
FIG. 8 depicts a plurality of main bodies each having particular protrusions that extend normal to the main body, in accordance with yet still others embodiments.

FIG. 8 depicts a plurality of main bodies 310 each having particular protrusions that extend normal to the main body 310, in accordance with yet still others embodiments. In some embodiments, the main body 310 is interchangeable with other variations of the main body 310 (e.g., main body 310a, main body 310b, main body 310c, and main body 310d) that allows the plurality of fasteners 120 to demountably couple onto different types of surfaces (e.g., metallic, polymeric, fabric, smooth, rigid, etc.). In certain embodiments, the plurality of fasteners 120 can each have a unique version of the main body 310 that facilitates coupling onto different types of surfaces. To be sure, the main body 310 (e.g., the main body 310b and the main body 310d) can include a plurality of ridges 805 oriented parallel to each other and extending normal thereto. The main body 310 (e.g., the main body 310c) can include a plurality of protuberances 810 positioned proximate to each other in a pattern and extending normal thereto. The main body 310 (e.g., the main body 310a) can include a plurality of arcuations 815 positioned proximate to each other and extending normal thereto.

Figure 2:
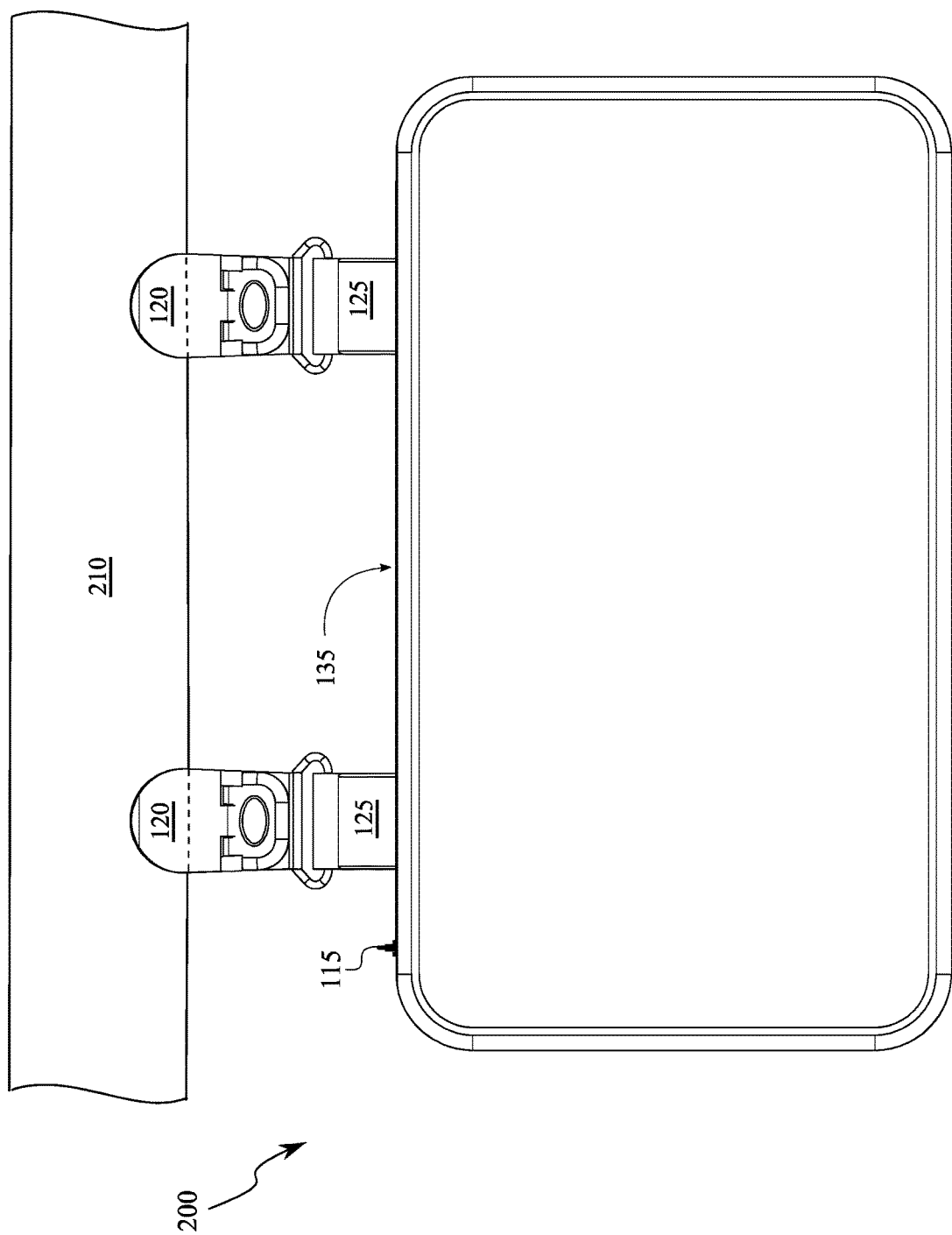
FIG. 2 depicts a front view of the enclosure in an affixed state, in accordance with other embodiments.
Figure 11:
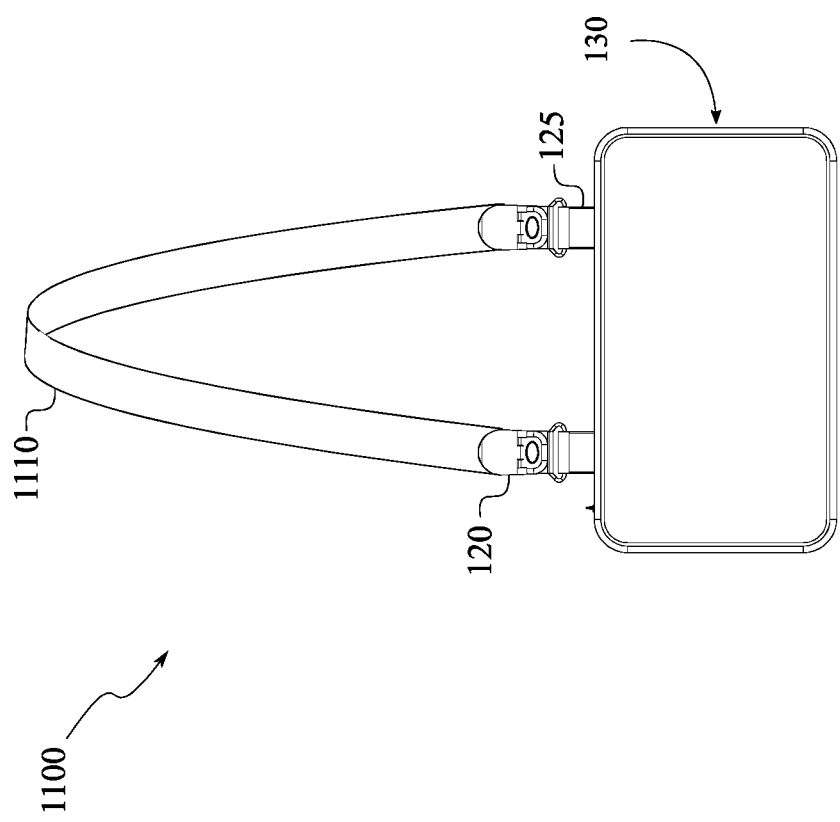
FIG. 11 depicts the enclosure in a carrying state, in accordance with yet still other embodiments.

The enclosure 100 has utility in a variety of environments. To be sure, the plurality of fasteners 120 allow the enclosure 100 to assume an affixed state 200 (e.g., as depicted in FIG. 2), a standing state 500 (e.g., as depicted in FIGS. 5 and 6) a carrying state 1100 (e.g., as depicted in FIG. 11). Here, in the affixed state 200, the enclosure 100 is demountably coupled to an object 210 via each fastener 120. For example, the object 210 can be any surface or panel to which each fastener 120 can couple to that include, but are not limited to curtains, apparel, baby strollers, bassinets, metal panels, fabrics, baby stroller canopies, and similar objects or structures.

In the standing state 500, each fastener 120 is also demountably coupled to the band and therewith forms a triangular support 610, and the enclosure 100 is oriented substantially vertical when resting on the triangular support 610. In preferred embodiments, the enclosure 100 also includes a carrying strap 1110. Here, in the carrying state 1100, the enclosure 100 is demountably coupled to the carrying strap via each of the fasteners As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments but should be defined only in accordance with the following claims appended hereto and their equivalents.

What is claimed is:

1. A protective and supportive enclosure, comprising:
a first panel;
a second panel;
a zipper;
a plurality of fasteners;
a plurality of bands;
wherein
the first panel and the second panel are affixed together and form a sleeve that comprises an opening;
the second panel comprises a polymer that is clear and electrically conductive;
the first panel and the second panel each comprise a polygonal overall shape;
the zipper is affixed to the opening;
each band is affixed to the primary panel proximate to the opening;
each fastener is pivotably coupled to a band;
the protective and supportive enclosure comprises a standing state and an affixed state;
in the standing state, each fastener is further demountably coupled to the band and therewith forms a triangular support, and the protective and supportive enclosure is oriented substantially vertical when resting on the triangular support; and
in the affixed state, the protective and supportive enclosure is demountably coupled to an object via each fastener.

2. The protective and supportive enclosure of claim 1, wherein
each fastener comprises:
a main body;
an engaging arm pivotably coupled to the main body;
a locking arm pivotably coupled to the main body proximate to the engaging arm;
the main body comprises a plurality of protrusions that extend normal to the main body;
the engaging arm is configured to engage the main body; and
the locking arm selectively locks the engaging arm in position when the engaging arm engages the main body.

3. The protective and supportive enclosure of claim 2, wherein
the main body comprises:
a plurality of ridges oriented parallel to each other and extending normal to the main body;
a plurality of protuberances positioned proximate to each other in a pattern and extending normal to the main body; or
a plurality of arcuations positioned proximate to each other and extending normal to the main body.

4. The protective and supportive enclosure of claim 3, wherein each of the bands is flexible.

5. The protective and supportive enclosure of claim 4, wherein
the sleeve comprises a partition; and
the partition comprises a polymeric material or a fabric.

6. The protective and supportive enclosure of claim 5, further comprising:
a carrying strap;
wherein
the protective and supportive enclosure further comprises a carrying state; and
in the carrying state, the protective and supportive enclosure is demountably coupled to the carrying strap via each of the fasteners.

7. The protective and supportive enclosure of claim 6, wherein at least one of the first panel and the second panel comprise an aperture.

8. The protective and supportive enclosure of claim 7, wherein the zipper is configured to hermetically seal the opening.

9. A protective and supportive enclosure, comprising:
a first panel;
a second panel;
a zipper;
a plurality of fasteners;
a plurality of bands;
a carrying strap;
wherein
the first panel and the second panel are affixed together and form a sleeve that comprises an opening;
the second panel comprises a polymer that is clear and electrically conductive;
the first panel and the second panel each comprise a polygonal overall shape;
the zipper is affixed to the opening;
each band is affixed to the primary panel proximate to the opening;
each fastener is pivotably coupled to a band;
the protective and supportive enclosure comprises a standing state, an affixed state, and a carrying state;
in the standing state, each fastener is further demountably coupled to the band and therewith forms a triangular support, and the protective and supportive enclosure is oriented substantially vertical when resting on the triangular support;
in the affixed state, the protective and supportive enclosure is demountably coupled to an object via each fastener; and
in the carrying state, the protective and supportive enclosure is demountably coupled to the carrying strap via each of the fasteners.

10. The protective and supportive enclosure of claim 9, wherein
each fastener comprises:
a main body;
an engaging arm pivotably coupled to the main body;
a locking arm pivotably coupled to the main body proximate to the engaging arm;
the main body comprises a plurality of protrusions that extend normal to the main body;
the engaging arm is configured to engage the main body; and
the locking arm selectively locks the engaging arm in position when the engaging arm engages the main body.

11. The protective and supportive enclosure of claim 10, wherein
the main body comprises:
a plurality of ridges oriented parallel to each other and extending normal to the main body;
a plurality of protuberances positioned proximate to each other in a pattern and extending normal to the main body; or
a plurality of arcuations positioned proximate to each other and extending normal to the main body.

12. The protective and supportive enclosure of claim 11, wherein each of the bands is flexible.

13. The protective and supportive enclosure of claim 12, wherein the sleeve comprises a partition; and the partition comprises a polymeric material or a fabric.

14. The protective and supportive enclosure of claim 13, wherein at least one of the first panel and the second panel comprise an aperture.

15. The protective and supportive enclosure of claim 14, wherein the zipper is configured to hermetically seal the opening.

\* \* \* \* \*